United States Patent
Claessen

(10) Patent No.: US 8,369,987 B2
(45) Date of Patent: Feb. 5, 2013

(54) METHOD AND SYSTEM FOR DELIVERING MULTI-MEDIA PRODUCTS

(75) Inventor: Albertus Maria Gerardus Claessen, Oakwood, GA (US)

(73) Assignee: NCR Corporation, Duluth, GA (US)

( * ) Notice: Subject to any disclaimer, the term of this patent is extended or adjusted under 35 U.S.C. 154(b) by 51 days.

(21) Appl. No.: 12/644,148

(22) Filed: Dec. 22, 2009

(65) Prior Publication Data

US 2011/0153071 A1  Jun. 23, 2011

(51) Int. Cl.
*G06F 17/00* (2006.01)
*G06Q 30/00* (2012.01)

(52) U.S. Cl. ......... 700/234; 700/244; 700/240; 700/232

(58) Field of Classification Search .................. 700/234, 700/244, 232, 240
See application file for complete search history.

(56) References Cited

U.S. PATENT DOCUMENTS

| 7,218,991 | B2 * | 5/2007 | Walker et al. ................. 700/234 |
| 7,529,597 | B1 * | 5/2009 | Hertz et al. ................... 700/241 |
| 7,779,058 | B2 * | 8/2010 | Shea ............................. 707/705 |
| 2002/0022453 | A1 * | 2/2002 | Balog et al. ..................... 455/41 |
| 2008/0004748 | A1 * | 1/2008 | Butler et al. ................. 700/244 |
| 2008/0250120 | A1 * | 10/2008 | Mick et al. .................... 709/219 |
| 2008/0288106 | A1 * | 11/2008 | Widergren et al. ........... 700/234 |
| 2009/0117846 | A1 * | 5/2009 | Mavrakakis ................ 455/3.06 |
| 2010/0191370 | A1 * | 7/2010 | Barragan Trevino et al. 700/244 |
| 2010/0211217 | A1 * | 8/2010 | Hirsh et al. ................... 700/234 |

* cited by examiner

*Primary Examiner* — Michael K Collins
(74) *Attorney, Agent, or Firm* — Paul W. Martin

(57) ABSTRACT

An apparatus, method and system are presented for delivering multi-media products using a self-service kiosk. The kiosk delivers the multi-media product on a DVD or electronically downloads the multi-media product via high-speed communications to a portable device. The high-speed communications allows the multi-media product to be downloaded in relatively short time period.

20 Claims, 4 Drawing Sheets

METHOD AND SYSTEM FOR DELIVERING MULTI-MEDIA PRODUCTS

FIELD OF THE INVENTION

The present invention relates to self-service kiosk systems and in particular to an apparatus, method and system for delivering multi-media products using a self-service kiosk.

BACKGROUND

A variety of different channels are used to distribute multi-media products to individual customers. One such channel involves storing a multi-media product on a DVD. Multi-media products stored on DVDs are sold or rented to a customer and delivered by mail or the customer visits a brick and mortar store or a DVD kiosk that is close by. Video games are another type of multi-media product and are also distributed using methods similar to the DVD.

Self-service kiosk systems are increasingly used to distribute multi-media products. Kiosk systems are placed in locations that people periodically visit such as a grocery store, drug store, office building, mall and other similar types of locations. The kiosk systems dispense and for rentals receive returned DVDs and video games. Using a kiosk system to buy or rent a multi-media product is more convenient than going to a brick and mortar store because there are more kiosk systems in more locations. The kiosks are also faster than waiting for a mail ordered product to be delivered. However, using a kiosk still requires that the customer transport and safeguard a physical DVD for each multi-media product and for rentals the customer still has to return each DVD or pay for the product.

Therefore, it would be desirable to provide an apparatus and method for delivering multi-media products without the above limitations.

SUMMARY

A self-service multi-media kiosk apparatus, system and method are provided for storing and dispensing multi-media products. In one implementation, the kiosk apparatus includes a computer that executes instructions, which control or implement the features and functions of the kiosk. The kiosk apparatus further includes a housing with four sides. Each side or face can support an independent user interface that allows a user to review and select multi-media products available from the kiosk. The user can select to buy or rent the product and then pay for the purchase. Kiosks have from one to four of the sides equipped with the user interface. Sides not originally equipped with the user interface can have a user interface added later.

The user may receive purchased multi-media product on a DVD or have the product downloaded to portable device, such as a PDA. The Kiosk supports a high-speed communications component for each user interface that is capable of downloading most products in less than a minute. To be able to download the product, the portable device must support high-speed communications that is compatible with the Kiosk's high-speed communications.

The user interface has a shelf where the portable device is placed so that the selected multi-media product or products can be downloaded to the portable device. An antenna array is located under the shelf. The Antenna array is designed to transmit and receive the signals associated with the high-speed communications. The antenna array is designed to direct and limit the signals to an area above and proximate the shelf. Each user interface of the kiosk has a shelf with an antenna array and can download products simultaneously without interfering with downloads occurring at other user interfaces. The kiosk also determines a quality of service as data for each product is being downloaded to the portable device. When the quality of service falls below a minimum level, the output power for the signals transmitted from the antenna array are adjusted to improve the quality of service.

The kiosk communicates with a server (using a different communications component, which is not associated with the high-speed communications) that monitors and tracks the operations and transactions of the kiosk. The server also provides software updates to the kiosk and multi-media products in digital form that can be purchased by users.

DETAILED DESCRIPTION

Figure 1:
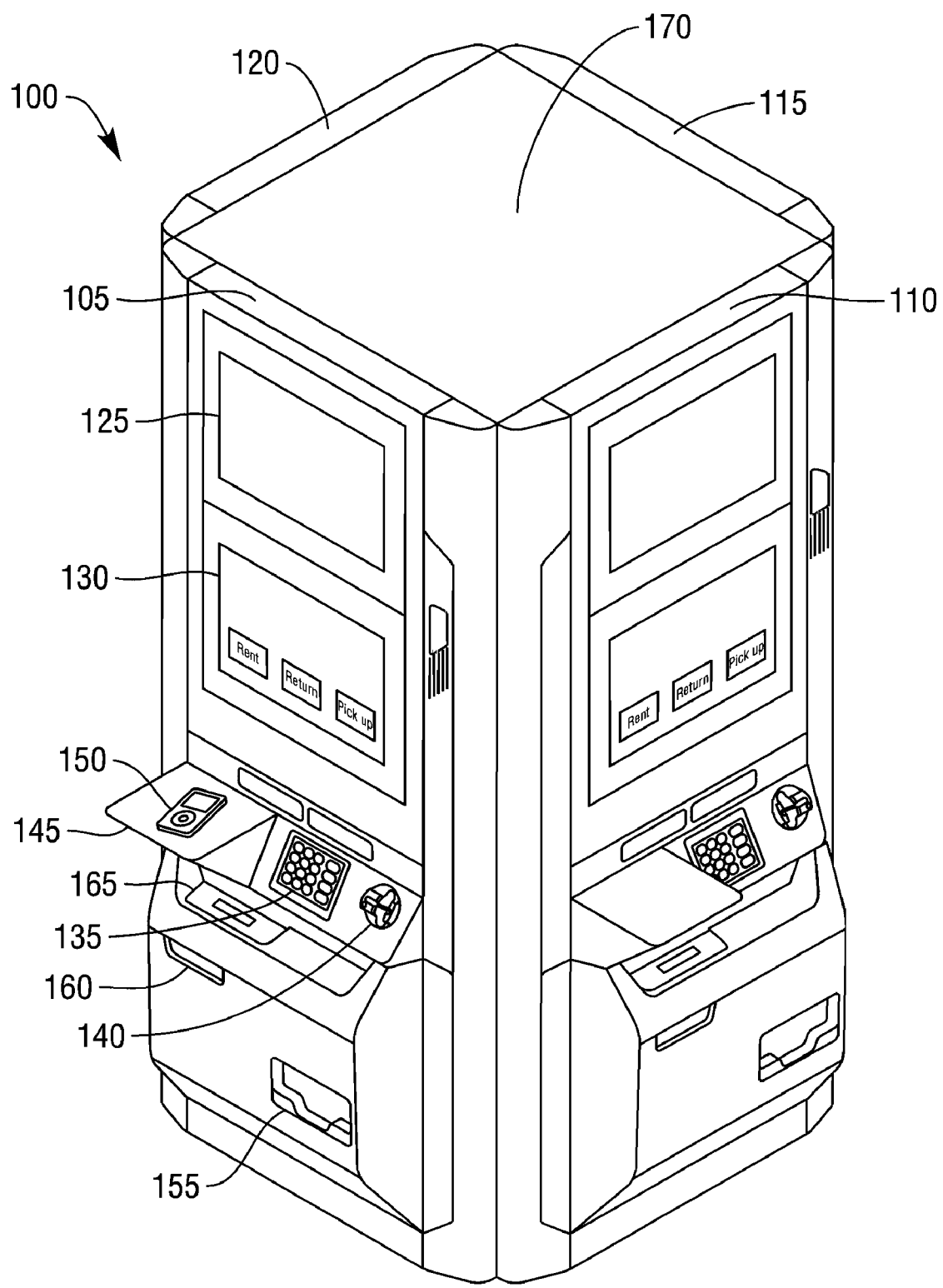
FIG. 1 is a high-level drawing illustrating an exemplar embodiment of a self-service multi-media kiosk apparatus.

Referring now to FIG. 1, there is provided a high-level drawing of an exemplar self-service multi-media kiosk apparatus 100. This embodiment depicts a kiosk 100 comprising a housing 170 with four sides or faces 105, 110, 115, 120 where each of the sides 105, 110, 115, 120 can support a user interface and functions that operate independently from any of the other user interfaces. The following descriptions reference the user interface, features and functions depicted on the first side 105 of the kiosk 100. In this embodiment, the other three sides 110, 115, 120 have user interfaces with the same or similar features and functions. An LCD advertising display 125 is located at the top of the side 105. This display 125 is used to advertise products available at the kiosk 100 or may, during a transaction, provide additional information to a customer using this user interface (side 105) of the kiosk 100. An LCD display 130 is located below the advertising display 125 and is used to interface with a customer using the kiosk 100. The display 130 has a touch screen allowing customers to touch locations on the display 130 to make selections or interact with the kiosk 100 during a transaction. A magnetic stripe reader (MSR) 140 is provided for reading credit cards, loyalty cards and identification cards. A keypad 135 is provided for entering PIN numbers associated with the cards read by the MSR 140. An opening 165 is provided to dispense a receipt or other printed information. Next to the keypad 135, the kiosk 100 has a shelf 145. A person digital assistant (PDA) 150 is shown resting in the center of the shelf 145. The kiosk 100 has an opening 155 for receiving DVDs being returned and an opening 160 for dispensing DVDs. In other embodiments, a single opening is used to dispense and return DVDs.

In the above embodiment, all four sides 105, 110, 115, 120 of the kiosk 100 have a user interface and all four user interfaces provide the same features and functions. In some embodiments, only one side of the kiosk 100 has a user interface. The other sides have solid panels with no user interface or they may have an advertising LCD and nothing else. In still other embodiments, a kiosk 100 has 2 or 3 sides that have a user interface. The number of sides that have a user interface can depend on the volume of customers that use the kiosk. The goal is to reduce the time a customers wait before being able to access a user interface on the kiosk. The more user interfaces on the kiosk, the shorter the wait time to access one of the user interfaces. In some embodiments that have multiple user interfaces, the features and functions of one user interface maybe different than the features and functions of one or more of the other user interfaces. For example, one user interface may support only purchases where the product is downloaded while other user interfaces may support only products purchased on a DVD. Still other user interfaces may support both download and DVD.

Figure 2:
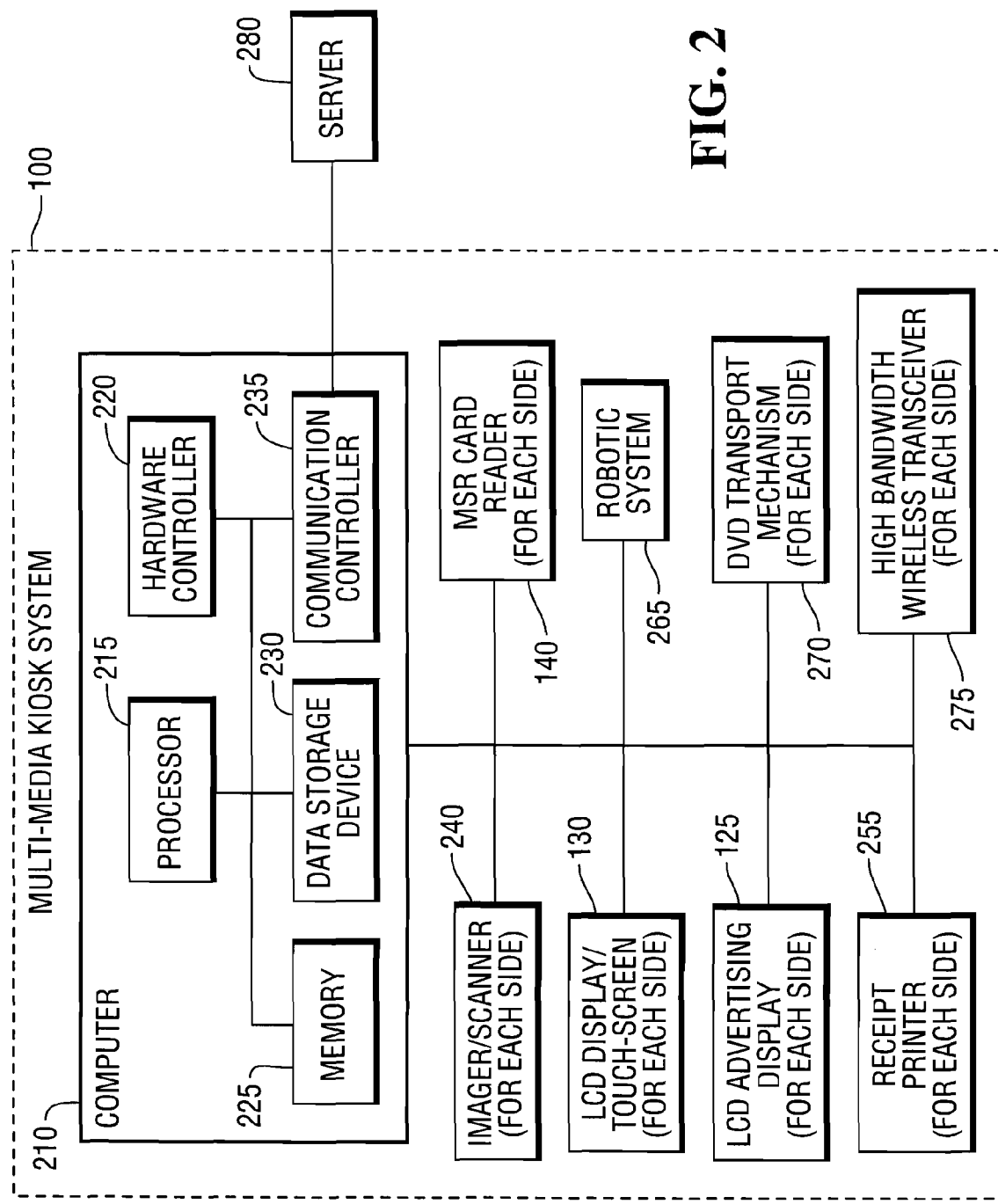
FIG. 2 is a high-level block diagram of a kiosk system that illustrates an exemplar computer and peripherals of a self-service multi-media kiosk apparatus.

Turn to FIG. 2, there is provided a high-level block diagram of a kiosk system 100 depicting a self-service multi-media kiosk apparatus 100 in communications with a sever 280. The kiosk 100 includes a computer 210 that controls all the peripherals and devices in the kiosk 100. The computer 210 also generates the software features and functions for the user interface on each of the four sides 105, 110, 115, 120 and controls the advertising that is displayed on the LCD advertising display 125.

The computer 210 comprises a memory 225 that stores instructions and data and a processor 215 that executes the instructions and manipulates the data stored in the memory 225. The computer 210 further comprises a data storage device 230, a communication controller 235 and a hardware controller 220.

The data storage device 230 is a permanent or long-term storage that stores instructions and data used by the computer 210 and multi-media product data. The data storage device 230 can be comprised of solid-state devices (i.e., flash memory, or rotating memory) or any other suitable device that provides non-volatile storage. The instructions stored in the data storage device 230 are organized into software programs (also called applications) that control the hardware and implement the functions and features of the kiosk 100. These programs are loaded into the memory 225 and executed by the processor 215 when power is provided to the kiosk 100.

The communication controller 235 provides hardware and software necessary to communicate with peripherals that are part of the kiosk 100 and one or more communication networks used to communicate with other computers such as the server 280. The communication controller 235 can support multiple networks such as Ethernet, WIFI and cellular based networks.

The hardware controller 220 provides the proper hardware to interface with the peripherals attached to and controlled by the computer 210.

The kiosk system 100 also comprises a number of peripherals devices. These include a imager/scanner 240, the magnetic stripe reader (MSR) 140, the LCD display with a touch-screen 130, a robotic system 265, a receipt printer 255 and a DVD transport mechanism 270. One or more programs executing on the computer 210 control all of the peripherals that comprise the kiosk 100.

The imager/scanner 240 captures an image of a DVD or scans a bar code on a DVD that is being dispensed or returned to identify the DVD and thus determine if it is the correct DVD for the requested operation. The imager/scanner can also scan a barcode on a driver's license to verify age, which is required in some states for renting 'R' rated or age restricted content. The imager/scanner can further scan barcodes on promotional coupons. In some embodiments, an RFID reader is used in place of or in addition to the imager/scanner to read an RFID tag attached to a DVD or other items e.g., a driver's license.

The LCD display and touch-screen device 130 is comprised of an LCD display for communicating information to a customer and touch-screen for receiving input from the customer (for this disclosure, a customer using the kiosk is the same as a user using the kiosk).

The MSR 140 reads a customer's loyalty card or credit card to identify a customer or to perform a transaction e.g., payment fulfillment for buying or renting a multi-media product. A pin pad 135 is included with the MSR 140. In some embodiments, a pin pad is created virtually on the LCD and touch-screen display 130 and there is no physical pin pad.

The DVD transport mechanism 270 receives a DVD from a customer, transports the DVD past the imager/scanner 240 for identification and then delivers the DVD to the robotic system 265 which places the DVD in a known location for storage. The DVD transport mechanism 270 also receives a DVD from the robotic system 265, transports the DVD past the imager/scanner 240 for identification and then delivers the DVD to a customer at a user interface. The DVD transport mechanism 270 also performs numerous other variations of these functions, e.g., returning a DVD to a customer when the DVD cannot be identified. The DVD transport mechanism 270 performs these functions for all user interfaces on all four sides 105, 110, 115, 120 of the kiosk 100.

The robotic system 265 retrieves a DVD from or deposits a DVD into one of multiple secure DVD storage locations located inside the kiosk system 100. The robotic system 265 is also connected to the DVD transport mechanism 270 and either receives a DVD from or delivers a DVD to the DVD transport mechanism 270. A program executed by the computer 210 maintains a record of each DVD stored in the Kiosk 100 and which storage locations it is stored in. The computer 210, controlled by the program, also causes the robotic system 265 to retrieve a DVD from or store a DVD into the proper storage location.

The receipt printer 255 prints a receipt with details of a transaction or other information and dispenses it to a customer through the opening 165 in the user interface.

A high bandwidth wireless transceiver 275 is also provided for communicating with a user provided PDA device 150. The PDA device 150 must support the same high bandwidth wireless communications. The transceiver 275 transmits and receives electromagnetic signals that carry electronic data in a frequency band centered around 60 GHz (Gigahertz). The transceiver 275 transmits at data rates that vary between 1 Gb/s (gigabits per second) to 26 Gb/s. This results in the transfer of product data to the PDA device 150 at between approximately 100 Mbytes per second and approximately 3 Gigabytes per second.

Additionally, the transceiver 275 varies the output power of the transmitted electromagnetic signals. This allows the transceiver 275 to achieve optimal data rates using the lowest possible power level so as not to interfere with similar transceivers located on other sides of the kiosk 100.

The server 280 is a central computer that communicates with one or more kiosks 100. The server 280 tracks each transaction at the kiosks 100 and maintains a list of all multi-media products stored and available in each kiosk 100. In addition, the server 280 processes payment transactions from each kiosk 100 for the sale or rental of multi-media products. In some embodiments, payment transactions are processed using other networks and servers available to the kiosk 100

(e.g., using a cell phone based network to communicate credit card transaction data to a server that will process the payment transaction).

Other functions of the server 280 include downloading digital versions of multi-media products to the kiosk 100 and software updates. Digital versions of multi-media products are stored in the computer 210 and are available for sale or rental.

The digital versions of multi-media products are transferred to a customer by direct download to the customer's PDA device 150 using the high bandwidth wireless transceiver 275. At the maximum transfer rate of the transceiver 275, a multi-media product containing 25 GB (Gigabytes) of data (the capacity of a single layered Blu-ray disk) takes approximately 8.4 seconds to transfer to the customers PDA 150. This is sufficiently fast enough so as not to inconvenience the customer or cause the customer to have a bad purchase experience. It is important that the download time for a product only require a small fraction of the total time needed for the customer to select and purchase the product.

Figure 3:
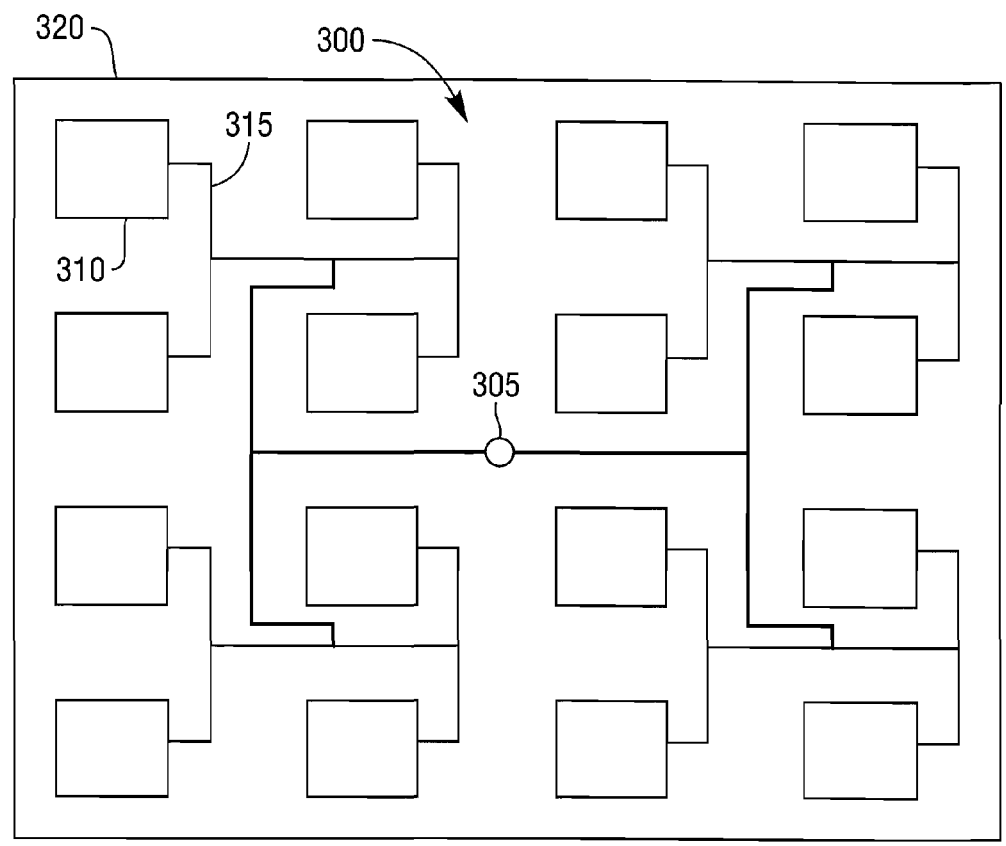
FIG. 3 is a high-level drawing illustrating an exemplar antenna array used to transmit and receive high frequency electromagnet signals.

Turning to FIG. 3, there is provided a high-level drawing illustrating an exemplar antenna array 300 used by the transceiver 275 to transmit and receive electromagnetic signals. The array 300 is implemented on a printed circuit board 320 (PCB). The array 300 includes 16 metal pads, as exemplified by a pad 310 in the upper left corner of the array 300. Each pad is etched on to an upper layer of the PBC 320 and they radiate and receive the electromagnetic signals.

Each pad is connected to a via 305 in the PCB 320 using equal length traces, represented by the trace labeled 315. This type of design is provided so that the electromagnetic signals radiated from each pad 310 have the same phase. The via 305 connects the equal length traces 315 on the pad layer of the PCB 320 with another trace on a different layer (not shown) of the PCB 320. At some point, an electrical connection is made between the pads and the transceiver 275. The antenna array 300 directs the electromagnetic signals into a narrow area of space directly above the array 300 and proximate to the shelf 145. A ground plane (not shown) located under the layer having the pads restricts the electromagnetic signals from propagating down from the pads. The array 300 depicted, is only part of the total antenna array. The array 300 is duplicated on the PCB 320 to create a large antenna array.

Figure 4:
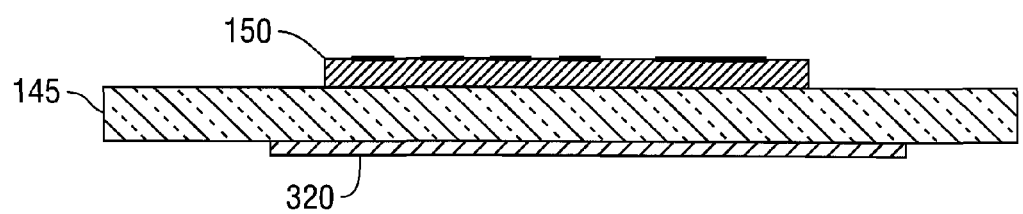
FIG. 4 is a drawing illustrating a partial cross section of a shelf of the exemplar self-service multi-media kiosk apparatus depicting the antenna array.

Turning to FIG. 4, there is provided a drawing illustrating a partial cross section of the shelf 145 of the user interface. The shelf 145 is constructed of plastic and provides a flat surface where the PDA 150 is placed. The PCB 320 is attached to the underside of the shelf 145 so that the pad layer of the PCB 320 is closest to the shelf 145. The electromagnetic signals radiated by the antenna array 300 on the PCB 320 travel up through the shelf 145 and are received by the PDA 150. Electromagnetic signals radiated by the PDA 150 travel through the shelf 145 and are received by the antenna array 300 on the PCB 320. The radiated and received signals are respectively received from and sent to the transceiver 275. The transmission or output power of the electromagnetic signal is adjusted so that the effective range is only a short distance above the shelf 145.

In other embodiments, the PCB 320 with the antenna array 300 is located behind a vertical panel next to the shelf 145. The electromagnetic signals radiated by the antenna array 300 are directed to the same location on the shelf 145 but from the side instead of from below as described previously.

Figure 5:
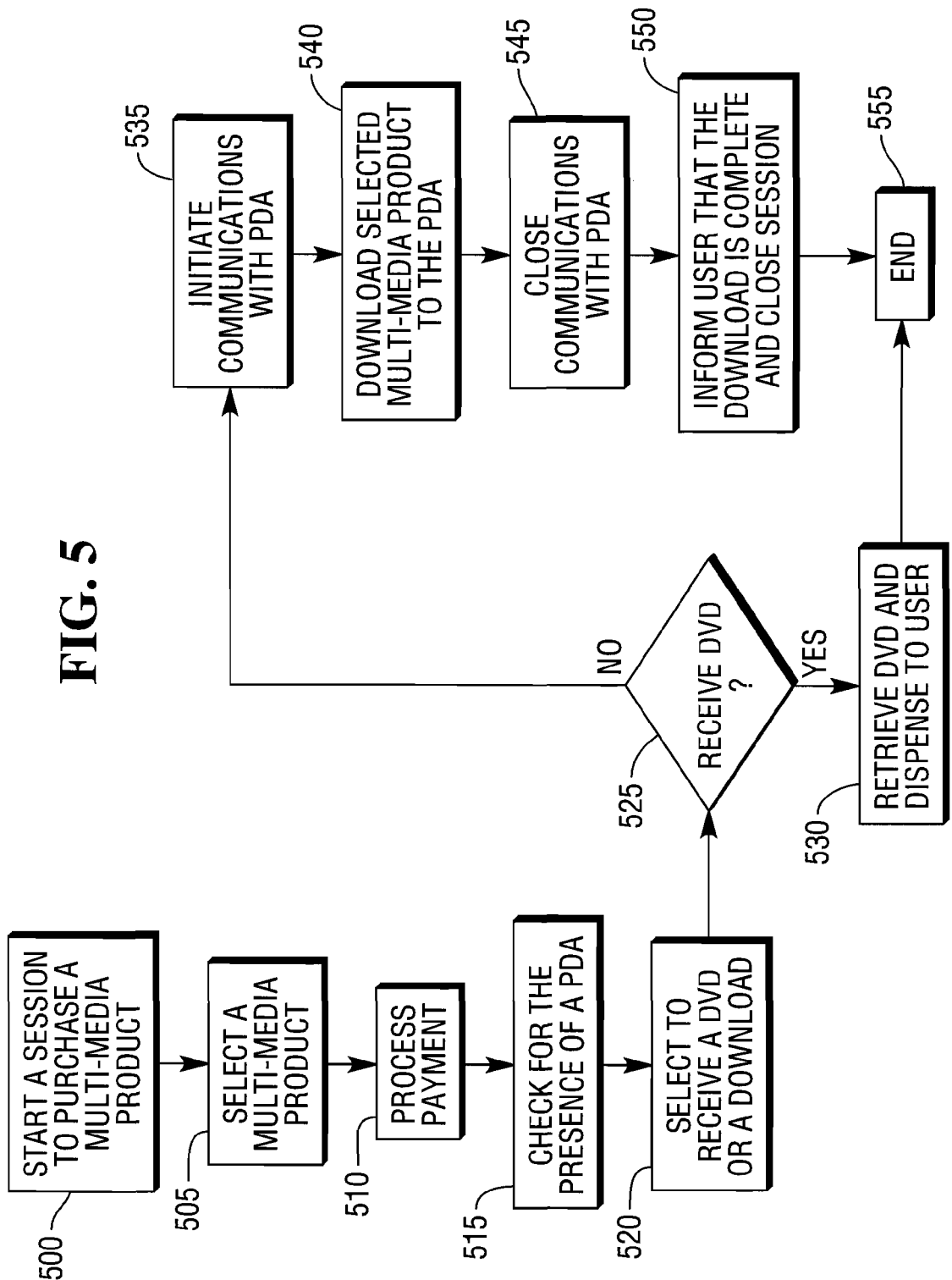
FIG. 5 is a high-level flow diagram illustrating the process steps used in an exemplar method for delivering a multi-media product to a customer.

Turning to FIG. 5, there is provided a high-level flow diagram of the process steps for a method to deliver a multi-media product to a customer. At step 500, a session is started with a customer using a user interface on the kiosk 100 to purchase a multi-media product. The purchase can involve the rental of a product or the sale of the product. At step 505, the customer views the multi-media products available from the kiosk 100 and selects one or more products to purchase. The payment for the purchase is processed in step 510. The user inserts a credit card into the MSR 140 and the kiosk 100 processes the payment using the card information. At step 515, the kiosk 100 checks the shelf 145 for the presence of a PDA 150 or any other device that is able to receive the selected products. To check for the presence of a device, the kiosk 100 causes the transceiver 275 to transmit a signal through the antenna array 300. If a device supporting the high-speed communications used by the transceiver 275, such as the PDA 150, is present on the shelf 145, the device receives the signal and responses with information to identify the device and its available storage. During this time, the kiosk 100 also determines the optimum output power level to achieve the fastest data transmission rates.

In step 520, the kiosk 100 displays a request on the LCD 130 requesting the user to select how to receive the purchased product. The user selects either to receive a DVD or have the product downloaded to the PDA 150. If the user selects DVD (step 525), the kiosk 100 causes the robotic system 265 to retrieve the DVD and the DVD transport mechanism 270 delivers the DVD to the customer (step 530). The session is closed and the process ends (step 555).

If the user does not select a DVD (step 525), the kiosk 100 starts the process of downloading the selected product. In step 535, the kiosk 100 initiates communications with the PDA 150 using the high-speed communications transceiver 275.

Next the selected multi-media product is downloaded or transferred into the PDA 150 (step 540). The processor 215 causes the data for the selected product to be moved from the data storage device 230 to the transceiver 275 where the data is transmitted to the PDA 150. During the data transfer, the processor 215 monitors the communications with the PDA to determine a quality of service metric. Errors in data transmission will cause the quality of service metric to go down. If transmission errors become too high, the processor 215 must either lower the data rate of the transfer or adjust the output power of the signals radiated from the antenna array 300. Lowering the data rate can reduce the number of transmission errors but it causes the transfer of data to take longer and lowers the customer's satisfaction level with the purchase. Adjusting the output power, either higher or lower, of the electromagnetic signals radiated from the antenna array 300 will also reduce the number of transmission errors. To keep the data transmission time as short as possible and the customer's satisfaction level high, it is desirable to adjust the output power first in an effort to raise the quality of service. In some cases, high output power will saturate the receiver of the PDA 150 causing data errors. In these cases, reducing the output power results in lower error rates. In other cases, the output power is too low or weak and increasing the output power lowers error rates.

When the download is complete, communication with the PDA 150 is closed (step 545). In step 550, the user is informed that the download is complete and the PDA 150 can be removed. The session is then closed and the process ends (step 555.)

In other embodiments, the kiosk 100 check for the presence of a PDA 150, or another compatible portable device, shortly after the session begins. The kiosk 100 will determine how much space is available in the PDA 150 for download and during the step where the user selects a multi-media product (505), products that cannot be downloaded due to insufficient space in the PDA 150 will be flagged with that status. The user maybe able to delete files on the PDA 150 so that larger products can be downloaded. Also, if the kiosk 100 fails to find a compatible device for download, the multi-media products available for selection by the user is restricted to products available on a DVD from the kiosk 100.

In still other embodiments, when the presence of a PDA 150, or other portable device with support for high-speed communications, is detected early in the session, the kiosk 100 will start the process of downloading a selected multimedia product prior to completion of payment processing for the purchase of the product. It is desirable to perform the download function in parallel with other functions so that the total time needed to purchase a product is as short as possible. This leads to a higher customer satisfaction with the overall process. In some embodiments, the multi-media product is encrypted and one or more keys are required to decrypt the product for use. In these cases, the encrypted product can be completely downloaded prior to completion of the payment for the product. Once payment has been confirmed, the key or keys can be downloaded. Since the key data is very small, it can be downloaded to the PDA 150 very quickly, usually under a second. This means that the process of purchasing and downloading a multi-media product will appear to be complete at the moment the payment is complete. This results in higher customer satisfaction. Should the payment be rejected, the kiosk 100 will not download the required key or keys and will send a request to have the downloaded data deleted by the PDA 150.

In still other embodiments, the product data is not encrypted but the download of product data can still start prior to confirmation of payment. The kiosk 100 will not download one or more critical elements of the product data until the payment is complete. For example, the kiosk 100 holds the last megabyte of data until the payment is complete. Once payment is confirmed, the kiosk 100 downloads the remaining data.

Although particular reference has been made to certain embodiments, variations and modifications are also envisioned within the spirit and scope of the following claims.

What is claimed is:

1. A self-service multi-media kiosk apparatus, for storing and dispensing multi-media products, the apparatus comprising:
   a housing;
   a first user interface located on a first side of the housing, the interface comprising:
      a first shelf;
      a first high speed wireless communications device; and
      a first high frequency antenna array connected to the first high-speed wireless communications device and proximate to the first shelf;
   a computer comprising:
      a processor;
      a short term memory storing instructions that when executed by the processor controls the features and functions of the first user interface; and
      a long term memory storing one of the multi-media products; and
   where the processor causes the first high-speed wireless communications device to transfer the one of the multi-media products stored in the long term memory to a portable device that is proximate to the first shelf using electromagnetic radiation radiated from the first high frequency antenna array and where the electromagnetic radiation is directed and limited to the area proximate to the first shelf and where a quality of service is periodically determined during the transfer of the multi-media product and when the quality of service falls below a minimum level of service, an output power of the electromagnetic radiation radiated from the first high frequency antenna array is adjusted to improve the quality of service.

2. The apparatus of claim 1, further comprising:
   a second user interface located on a second side of the housing, the interface comprising:
      a second shelf;
      a second high speed wireless communications device;
      a second high frequency antenna array connected to the second high speed wireless communications device and proximate to the second shelf; and
      where the processor causes the second high-speed wireless communications device to transfer the one of the multi-media products stored in the long term memory to a portable device that is proximate to the second shelf using electromagnetic radiation radiated from the second high frequency antenna array and where the electromagnetic radiation is directed and limited to the area proximate to the second shelf and where a quality of service is periodically determined during the transfer of the multi-media product and when the quality of service falls below a minimum level of service, an output power of the electromagnetic radiation radiated from the second high frequency antenna array is adjusted to improve the quality of service.

3. The apparatus of claim 2, further comprising:
   a third user interface located on a third side of the housing, the interface comprising:
      a third shelf;
      a third high speed wireless communications device;
      a third high frequency antenna array connected to the third high speed wireless communications device and proximate to the third shelf; and
      where the processor causes the third high-speed wireless communications device to transfer the one of the multi-media products stored in the long term memory to a portable device that is proximate to the third shelf using electromagnetic radiation radiated from the third high frequency antenna array and where the electromagnetic radiation is directed and limited to the area proximate to the third shelf and where a quality of service is periodically determined during the transfer of the multi-media product and when the quality of service falls below a minimum level of service, an output power of the electromagnetic radiation radiated from the third high frequency antenna array is adjusted to improve the quality of service.

4. The apparatus of claim 3, further comprising:
   a fourth user interface located on a fourth side of the housing, the interface comprising:
      a fourth shelf;
      a fourth high speed wireless communications device;
      a fourth high frequency antenna array connected to the fourth high speed wireless communications device and proximate to the fourth shelf; and
      where the processor causes the fourth high-speed wireless communications device to transfer the one of the multi-media products stored in the long term memory to a portable device that is proximate to the fourth shelf using electromagnetic radiation radiated from the fourth high frequency antenna array and where the electromagnetic radiation is directed and limited to the area proximate to the fourth shelf and where a quality of service is periodically determined during the transfer of the multi-media product and when the quality of service falls below a minimum level of service, an output power of the electromagnetic radiation radiated from the fourth high frequency antenna array is adjusted to improve the quality of service.

5. The apparatus of claim 1, wherein the first high-speed wireless communication device transfers data to the portable device at data rates that are equal to or greater than 1 Gigabit per second.

6. The apparatus of claim 2, wherein the second high-speed wireless communication device transfers data to the portable device at data rates that are equal to or greater than 1 Gigabit per second.

7. The apparatus of claim 3, wherein the third high-speed wireless communication device transfers data to the portable device at data rates that are equal to or greater than 1 Gigabit per second.

8. The apparatus of claim 4, wherein the fourth high-speed wireless communication device transfers data to the portable device at data rates that are equal to or greater than 1 Gigabit per second.

9. The apparatus of claim 1, wherein the multi-media product is a video product.

10. The apparatus of claim 1, wherein the multi-media product is a video game.

11. A computer implemented method in a multi-media self-service kiosk for dispensing multi-media products, the method comprising:
displaying the multi-media products available for rent or purchase;
processing a payment for a selected multi-media product;
detecting the presence of a PDA where the PDA has a compatible high-speed communications component;
transferring the selected multi-media product to the PDA using the high-speed communications component; and
periodically determining a quality of service for the communications during the transferring of the multi-media product and when the quality of service falls below a minimum level of service adjusting communication parameters to improve the quality of service.

12. The method of claim 11, further comprising directing and limiting the high-speed communications to an area proximate to a shelf on the kiosk.

13. The method of claim 11, wherein transferring the selected multi-media product to the PDA includes transferring the product to the PDA at data rates that are equal to or greater than 1 Gigabit per second.

14. The method of claim 11, wherein the minimum level for the quality of service results in a data rate of 1 Gigabit per second.

15. The method of claim 11, wherein the selected multi-media product is a video product.

16. The method of claim 11, wherein the selected multi-media product is a video game.

17. A self-service multi-media kiosk system, for storing and dispensing multi-media products, the system comprising:
a central server;
a self-service multi-media kiosk comprising:
a housing;
a first user interface located on a first side of the housing, the interface comprising:
a first shelf;
a first high speed wireless communications device; and
a first high frequency antenna array connected to the first high-speed wireless communications device and proximate to the first shelf;
a computer comprising:
a processor;
a short term memory storing instructions that when executed by the processor controls the features and functions of the first user interface; and
a long term memory storing one of the multi-media products; and
where the processor causes the first high-speed wireless communications device to transfer the one of the multi-media products stored in the long term memory to a portable device that is proximate to the first shelf using electromagnetic radiation radiated from the first high frequency antenna array and where the electromagnetic radiation is directed and limited to the area proximate to the first shelf and where a quality of service is periodically determined during the transfer of the multi-media product and when the quality of service falls below a minimum level of service, an output power of the electromagnetic radiation radiated from the first high frequency antenna array is adjusted to improve the quality of service and where the central server monitors the functions of the kiosk.

18. The system of claim 17, wherein the first high-speed wireless communication device transfers data to the portable device at data rates that are equal to or greater than 1 Gigabit per second.

19. The system of claim 17, wherein the multi-media product is a video product.

20. The system of claim 17, wherein the multi-media product is a video game.

* * * * *